March 25, 1941.　　　　M. IRELAND　　　　2,236,406
TIMER CONTROL MEANS
Filed March 28, 1940　　　　3 Sheets-Sheet 1
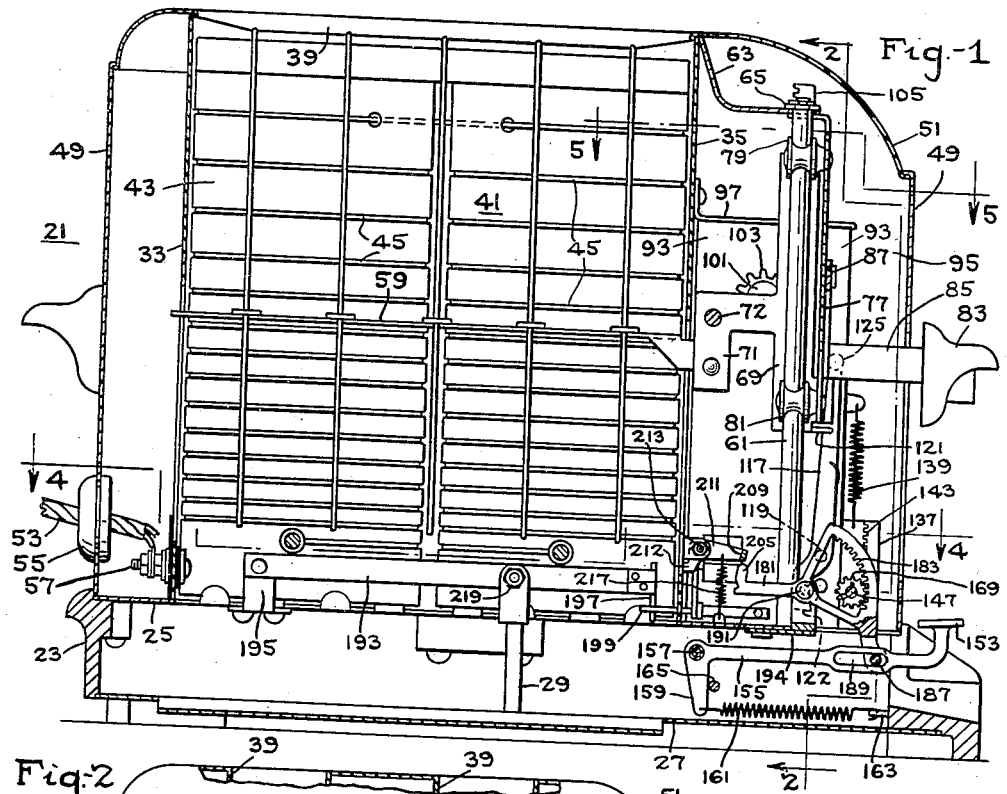
Fig.-1
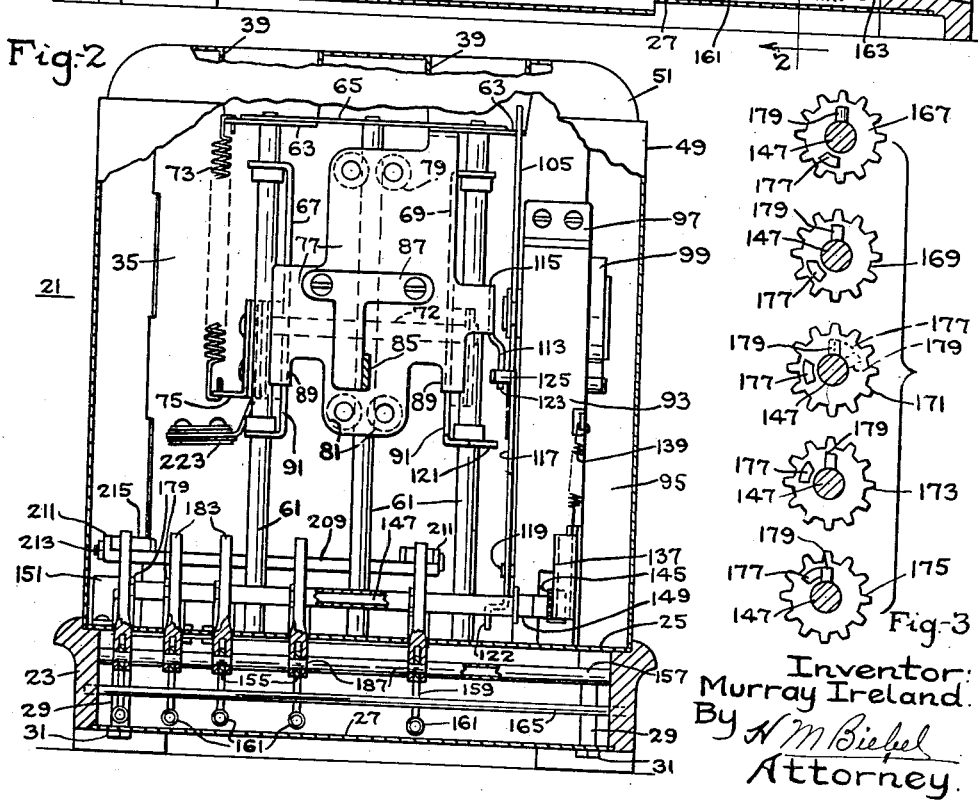
Fig.2
Fig.-3
Inventor:
Murray Ireland.
By H. M. Biefeld
Attorney.

March 25, 1941.                 M. IRELAND                     2,236,406
                            TIMER CONTROL MEANS
                          Filed March 28, 1940            3 Sheets-Sheet 2
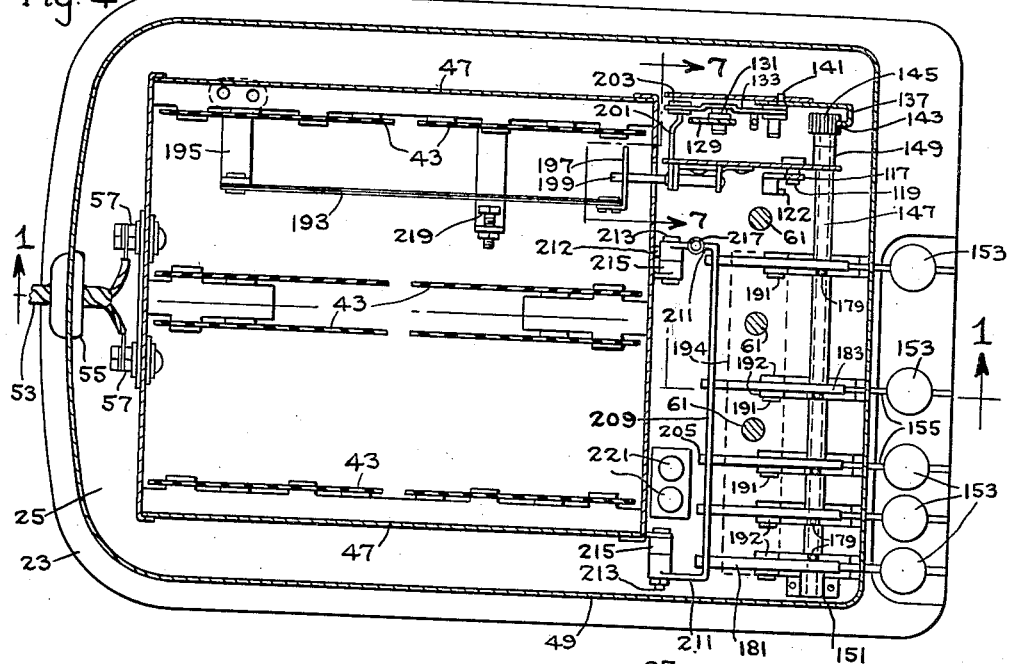
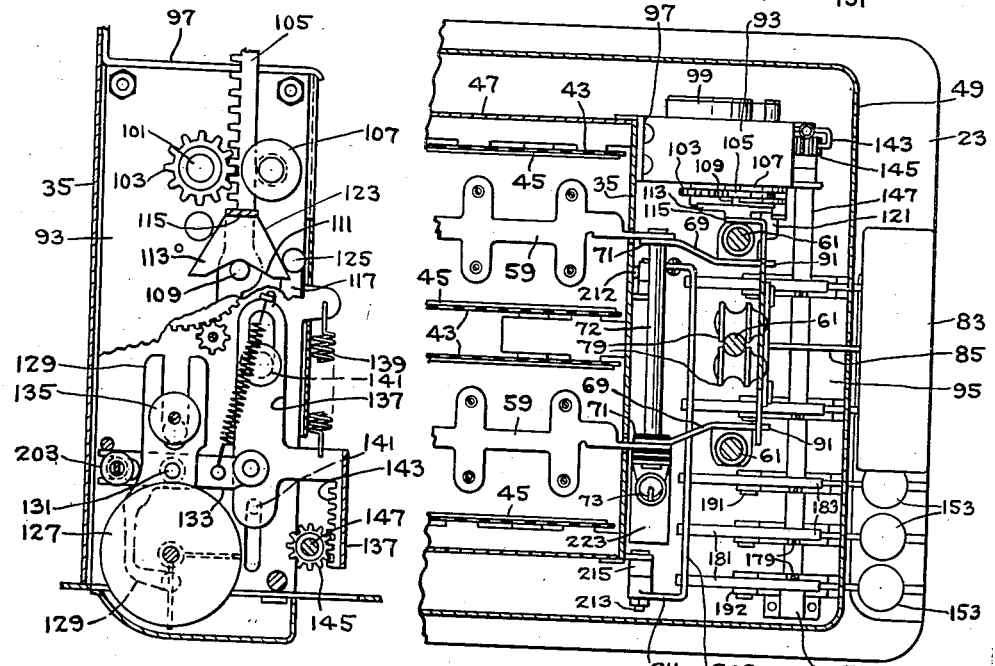
Fig.-4  Fig.-5  Fig.-6
Inventor
Murray Ireland.
By H. M. Biebel
Attorney.

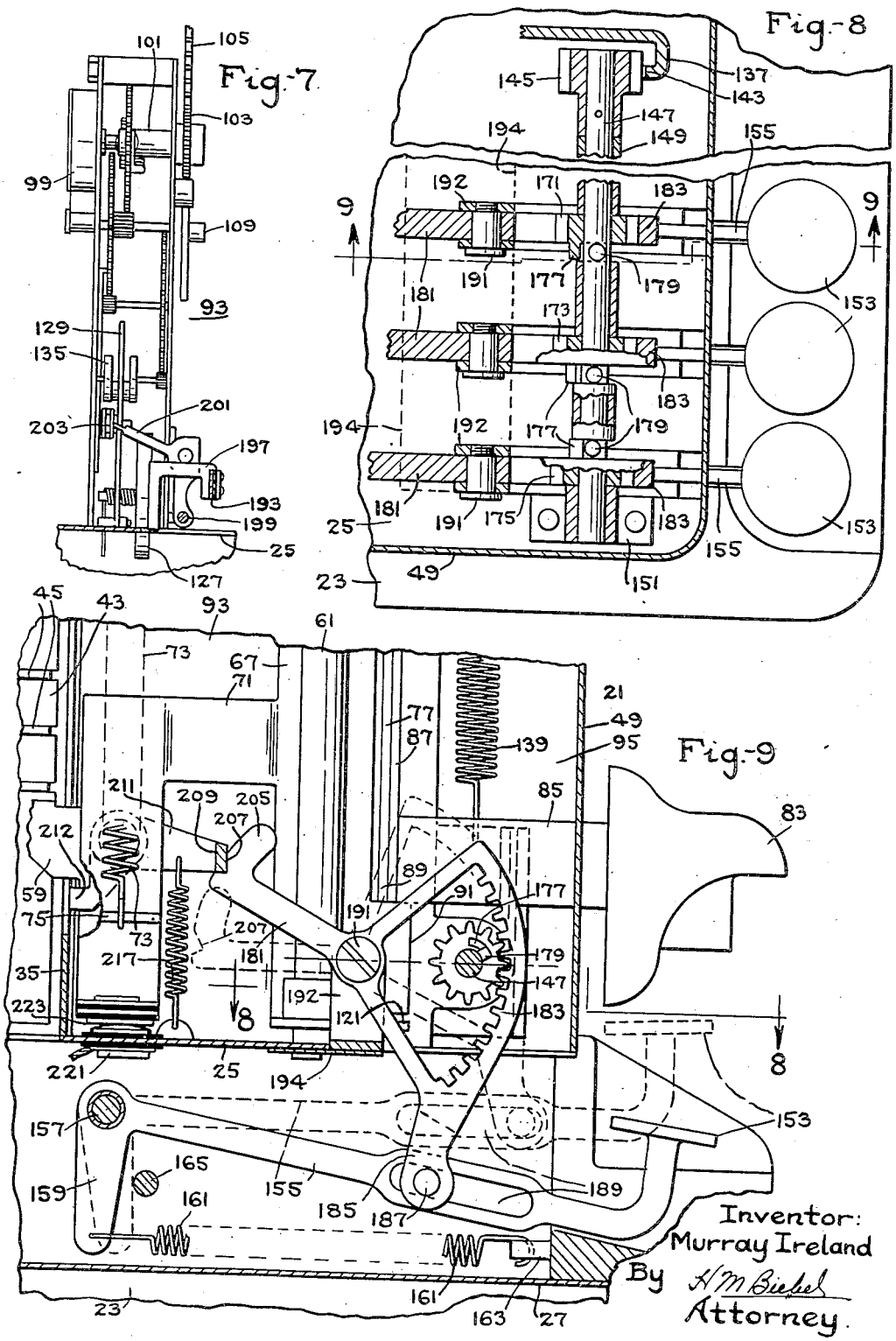

Patented Mar. 25, 1941

2,236,406

UNITED STATES PATENT OFFICE 2,236,406

TIMER CONTROL MEANS

Murray Ireland, near Elgin, Ill., assignor to McGraw Electric Company, Elgin, Ill., a corporation of Delaware Application March 28, 1940, Serial No. 326,357

4 Claims. (Cl. 161—16)

My invention relates to automatic electric toasters and more particularly to control or adjusting means for a timer associated with a cooking, baking or toasting appliance to determine the duration of a cooking operation.

An object of my invention is to provide timer speed-adjusting means comprising a plurality of push buttom actuated lever arms.

Another object of my invention is to provide a plurality of lever arms each movable through a like distance to cause different degrees of movement of a speed-changing member associated with a mechanical timer.

Other objects of my invention will either be apparent from the description of a device embodying my invention or will be more particularly pointed out in the course of such description and set forth in the appended claims.

In the drawings:

Figure 1 is a central vertical sectional view through a toaster embodying my invention taken approximately on the line 1—1 of Fig. 4 showing all parts in non-toasting position.

Fig. 2 is a front elevational sectional view taken on the line 2—2 of Fig. 1, all parts being shown in non-toasting position.

Fig. 3 shows enlarged detail views of a plurality of pinions in their non-operative positions, Fig. 4 is a horizontal sectional view taken on the line 4—4 of Fig. 1, Fig. 5 is a fragmentary horizontal sectional view taken on the line 5—5 of Fig. 1, Fig. 6 is a view on a somewhat enlarged scale of the timer showing in detail and section some of the parts, Fig. 7 is a view on a slightly enlarged scale of the timer showing its cooperating relation with the bimetal bar within the toaster taken approximately on the line 7—7 of Fig. 4, Fig. 8 is an enlarged sectional view on the line 8—8 of Fig. 9 showing details of construction of some of the parts which operate the timer rack, and, Fig. 9 is an enlarged sectional view taken on the line 9—9 of Fig. 8 showing, in full lines, certain parts in toasting position and, in dotted lines, in non-toasting position.

The use of an adjustable or variable speed mechanical timer to determine the duration of a toasting operation is already well known and reference is here made to Patent No. 1,866,808 issued July 12, 1932, to Murray Ireland, a mechanical timer of the kind disclosed and claimed in said patent constituting a part of the structure utilized in the present timer for controlling a toaster. The use of a thermal element for causing a change in the speed of operation of the mechanical timer of the above described type is also well known from Patent No. 2,138,674 issued November 29, 1938, to M. H. Graham, both this patent and the Ireland patent being assigned to the same assignee as is the present application.

The above mentioned Ireland patent discloses the use of a manually operable timer adjusting knob on the outside of a toaster casing whereby any desired speed of operation of the mechanical timer may be obtained and, as noted above, the Graham patent discloses the use of a bimetallic bar subject to the temperature of the toasting chamber for varying the speed of operation of the timer to cause it to run faster upon increase of temperature of the toasting chamber and of the toaster structure.

The present invention discloses more particularly a plurality of manually operable buttons or keys mounted on lever arms, each lever arm being connected through lost motion means with the spring-driven mechanical timer so that actuation of one of these buttons by the user of a toaster will determine the initial speed of operation as it may exist independent of temperature changes in the toaster itself. As will be pointed out hereinafter, the manual speed-changing mechanism associated with the spring-driven mechanical timer is biased to one extreme of its mechanical movement and, as will be shown in the drawings and described in the following specification, I have elected to show the timer mechanism normally biased to its slowest speed of operation as shown in Fig. 6, the plurality of manually actuable buttons causing selective increase in the speed of operation and therefore shorter periods of time for a toasting operation.

Referring first of all to the general structure of the toaster assembly, I have illustrated a toaster designated generally by the numeral 21 which includes a skeleton base frame 23 of moulded composition material having secured thereto adjacent its upper surface a metallic base plate 25 and having secured thereto adjacent its bottom edge a removable crumb tray 27 which may be held in proper operative place against frame 23 by a plurality of short studs 29 having nuts 31 thereon at their respective lower ends to hold the crumb tray 27 in desired operative position.

I provide a rear intermediate wall 33 and a front intermediate wall 35 which may be made of thin sheet metal and have their lower edges secured against the bottom plate 25 in any suitable or desired manner. A top frame plate 39 extends horizontally and longitudinally of the toaster structure and since I have elected to show a two-slice toaster, there will be two such top frame plates which interfit with the upper edges of intermediate walls 33 and 35 to hold them in properly spaced positions relatively to each other.

I provide further two pairs of spaced-apart vertically extending planar heating elements 41 each comprising one or more sheets 43 of electric insulating material such as mica having wound thereon, in a manner now well known in the art, a resistor strip 45. There will be, therefore, two radiant heating elements for each slice of bread to be toasted simultaneously in a toaster of this kind, all as more clearly set forth in my earlier Patent No. 2,001,362. If desired, I may provide outer baffle plates 47 made of aluminum to help to retain the heat generated by the plurality of heating elements within the toasting chambers of which there may be two in a two-slice toaster.

I provide further an outer casing 49 which may include front, rear and two side walls and which may be open at the top and at the bottom a cover 51 being provided to interfit therewith to provide a substantially enclosing outer casing for the toasting chamber and other mechanism to be hereinafter described comprising a part of the entire assembly. A twin conductor cord 53 may extend outwardly through a bushing 55 mounted in the rear wall of the casing 49 having leads connected to a plurality of terminal pins 57, all in a manner well known in the art.

I provide also a pair of horizontally extending bread carriers 59, each positioned between the two vertical heating elements of a pair of such elements, each bread carrier being provided with a rearwardly extending portion projecting through a slot in the rear intermediate wall 33 and having a portion extending forwardly of the front intermediate wall 35 through a vertical slot therein, all in a manner well known in the art.

Means for effecting reciprocal vertical movement of the bread carriers in the toasting chamber relatively to the heating elements may include a plurality of vertical standards 61, the lower ends of which may fit into and be supported by the bottom plate 25 while the upper ends thereof may be properly supported and held in spaced position by forwardly extending portions 63 of the top frame plates and by a cross bar 65, all in a manner now well known in the art.

A pair of sliders 67 and 69 are mounted respectively on the left-hand outer standard 61 and on the right-hand outer standard 61 and these sliders may have rearwardly extending portions 71 to which the front end projections of carriers 59 may be secured by means of a cross pin 72, so that the two sliders 67 and 69 and the carriers 59 will move as a unit simultaneously vertically on the outer standards 61, the carriers moving therewith. A coil spring 73 may have one end connected to a projection 63 of the left-hand top frame plate and have its other end connected to a lug 75 secured to the slider 67 near its lower end, suitable provision being made for mounting the bracket 75 on the slider. A carriage plate 77 is provided with an upper pair of rollers 79 and a lower pair of rollers 81, which rollers are adapted to engage and move on the intermediate standard 61 as will be clearly apparent from Fig. 2 of the drawings. The carriage plate 77 has movement on its central standard 61 relatively to the pair of sliders 67 and 69 but when moved downwardly by knob 83, which is mounted on a forwardly extending bar 85 constituting a part of an auxiliary bracket 87 secured to the carriage plate 77, projections 89 near the left and right-hand lower edges of carriage 77 will engage projections 81 on sliders 67 and 69 so that the sliders will move down with the carriage plate and the knob.

A spring-actuated mechanical timer 93 of the kind disclosed and claimed in my Patent No. 1,866,808 constitutes a means for determining the duration of a toasting operation and may be held in proper operative position at the right-hand edge of the front intermediate plate 35 and in front thereof in what may be called a mechanism chamber 95, by a top bracket 97. A timer spring 99 is mounted on an arbor 101 extending through the timer structure and having a pinion 103 secured fixedly thereon which pinion meshes with a vertically movable rack bar 105. This rack bar is held in meshing engagement with pinion 103 by a grooved roller 107. The rack bar is provided adjacent its lower end with a laterally projecting pin 109 which pin is adapted to fit into a recess 111 of substantially inverted V-shape, which recess is provided in a projection 113 constituting a part of or secured to a projecting portion 115 of carriage plate 77. Downward movement of the carriage plate 77 and of the parts associated therewith as by pressure on the knob 83 by an operator will cause downward movement of portion 113 and of the rack bar whereby the timer is wound to a predetermined degree.

The timer is provided with a pivoted detent lever 117 secured against the inside surface of the timer structure as by a pin 119 near its lower end, the lower end 122 of the lever being adapted to be engaged by a projection 121 on the right-hand slider 69 so that when the sliders have been moved downwardly to cause the carriers to move into toasting position, the sliders and the carriers will be held in their lowermost position for a predetermined time until the unwinding spring 99 has caused sufficient upward movement of the rack bar 105 so that a cam surface 123 on portion 113 will engage a lateral pin 125 mounted on detent lever 117 adjacent its upper end to cause clockwise turning movement of the detent lever arm 117 (as seen in Fig. 6) to cause releasing movement of lever arm 117 and quick upward movement of the sliders and bread carriers to their upper non-toasting position under the influence of spring 73.

Reference more particularly to Fig. 6 of the drawings shows certain of the detailed parts of the mechanical timer including a balance wheel 127 which is adapted to be engaged by an oscillating lever arm 129 which oscillator is pivotally mounted as at 131 on a supporting arm 133, both ends of which may be moved by different and separate means. The oscillator 129 is actuated by an eccentric 135 which eccentric is connected to and actuated by a plurality of gears and pinions, all as disclosed in my earlier above mentioned patent.

The right-hand end of supporting arm 133 is pivotally connected to a vertically movable member 137 which is spring-biased by a coiled spring 139 to its uppermost position which may be defined by guide pins 141. A rack 143 constitutes a part of member 137 and a pinion 145 meshes with this rack bar which pinion is mounted on a shaft 147 which shaft may be supported by bearing brackets 149 and 151 for limited turning movement. It may be here pointed out that when the rack bar 143 is in its uppermost position substantially as shown in Fig. 6 of the drawings, the speed of operation of the timer will be relatively low and will increase with downward movement of speed-adjusting member 137, all as set forth in my above mentioned Patent No. 1,866,808.

Referring now more particularly to Figs. 8 and 9 of the drawings, I have there illustrated the details constituting more particularly my present invention. I provide a plurality, in this case five, push buttons 153 each of which is mounted on an auxiliary speed-adjusting lever arm 155, the inner end of which is pivotally mounted on a shaft 157 to permit of limited turning movement by an operator when the operator presses downwardly on the push button. Since a toaster of this kind, when constructed for domestic use as on a breakfast table, is relatively light, it is highly desirable that substantially vertical downward pressure only be required to move the push button downwardly so as to preclude horizontal movement of the toaster on the table. Each of the lever arms 155 may be of bell crank form having a short arm 159 to the outer end of which is connected one end of a biasing spring 161, the other end of which may be connected to a lug 163 secured to skeleton frame 23 or to any other fixed point. A stop means 165 which may take the form of a fixed bar or rod, limits the counter-clockwise movement of the arms 155 to substantially the position shown in broken lines in Fig. 9 of the drawings.

Shaft 147 has freely mounted thereon a plurality of pinions 167, 169, 171, 173 and 175, each of these pinions having integral therewith or secured thereto a lateral lug 177. The shaft 147 is provided with a plurality of short radially-projecting pins 179 fixed therein, this plurality of pins being axially alined on the shaft 147 as is shown more particularly in Fig. 3 of the drawings.

I provide further a plurality of segmental gear arms 181 of the general shape as shown in Fig. 9 of the drawings, the segmental gear 183 thereof being adapted to mesh with the pinions 167 to 175 inclusive for the respective members 181. Member 181 may be provided with a depending portion 185 which is pivotally connected to an arm 155 therebelow as by a pin 187 secured to portion 185, this pin fitting into an elongated slot 189 in arm 155. It may here be pointed out that while I have elected to show an auxiliary arm 155, connected with a segmental gear member 181, I am not limited thereto since a push button 153 may be fixedly connected with portion 185 of arm 181 when applied to a different form of toaster.

The segmental gear members 181 are individually pivotally mounted on pins 191 which are supported by individual bearings 192 that are integral with plate 194 attached to base plate 25, and it may be noted that the spring 161 associated with each of the lever arms 155 and therefore with the respective members 181, will normally maintain these parts in the positions shown in broken lines in Fig. 9, that is, with the push button in its uppermost position. When assembling the pinions 167 to 175 on the shaft 147 and meshing them individually with the respective segmental gear portions 183, they are so assembled that the lugs 177 on the respective pinions will be normally spaced from the pins 179 by a different amount for each of the pinions 167 to 175 inclusive. That is, the lug on pinion 167 will be spaced a relatively large angular distance from pin 179 while the lugs on the next successive pinions will be spaced a lesser distance to thereby provide different degrees of lost motion between the lugs 177 and therefore between the pinions 167 to 175 inclusive and the pins 179 cooperating with the lugs on the respective pinions. It may be noted that the distance between a lug 177 on pinion 167 and a pin 179 is normally such that actuation of the button corresponding to pinion 167 after some other button had been actuated, would result in movement of member 137 to its uppermost limiting position. This permits of having one of the timer control buttons operated to obtain the darkest degree of toasting at one operation and obtaining some lighter degree of toasting at a succeeding operation by pressing another button, that is, the user has only to press on a different button to obtain another degree of toasting when starting a new toasting operation.

As was hereinbefore set forth, the speed-changing member 137 is positioned to cause the timer to operate at its slowest manually controllable speed to cause the toaster to provide the darkest desired degree or color of toast. If, now, that push button 153 operatively associated with pinion 169 be moved downwardly a fixed distance, the pin 179 fixed in shaft 147 will be moved angularly through a relatively small distance only thereby causing small turning movement of pinion 145 and a small downward movement of rack bar 143 and of the speed-changing member 137 to thereby cause slightly higher speed of operation of the timer and therefore a degree of toasting which will not be darkest but which may, for example, be "darker," will be obtained. It will be noted more particularly from Fig. 3 of the drawings that if push buttons operatively associated with respectively pinions 169, 171, 173 and 175 are individually moved downwardly a fixed distance, that the associated pins 179 will be caused to move through successively larger degrees of turning movement and therefore cause greater downward movement of the speed-changing member 137. Thus it will be noted by reference to the lowermost pinion 175 in Fig. 3 that lug 177 is substantially in engagement with its cooperating pin 179 so that downward movement of its cooperating or associated push button 153 will cause the maximum degree of movement of the speed-changing member 137 to cause say a relatively light degree of toasting.

As I desire to provide and make use of a thermal control of my variable and adjustable speed timer, I provide a thermoflexible bar 193 having one end thereof supported by a bracket 195 in one of the toasting chambers, the other end of the bar 193 having mounted thereon a recessed bracket 197 adapted to engage a pin 199 which is fixed in one arm of a bell crank lever 201 pivotally mounted on the timer, the outer end of the other arm engaging an apertured member 203 which fits into the forked end of member 133. It is thus obvious that movement of bimetal bar and of the bracket 197 thereon in a right-hand direction as seen in Fig. 7 of the drawings, will cause downward movement of member 203 and therefore downward movement of pivot pin 131 with resultant downward movement of the oscillator 129 to thereby cause an increase in the speed of operation of the timer in accordance with increase of the temperature of the toaster structure or of the toasting chamber, to which the bar 193 is subjected. The same result was obtained with downward movements of the speed-adjusting member 137 since under those conditions member 203 was substantially fixed so that downward movement of member 137 caused downward movement of the oscillator 129 and therefore an increase of the speed of operation of the timer. With a fixed position of member 137 it is obvious that downward movement of member 203 will act as hereinbefore described to increase the speed of the timer.

I provide also means for locking an actuated segmental gear member 181 in its actuated position and for this purpose I provide the rearwardly extending portion or arm thereof with a short arcuate portion 205 shown more particularly in Fig. 9 of the drawings and I provide this portion 205 with a recess or notch 207 which notch or recess may be of substantially triangular shape. A locking bar 209 is common to the plurality of segmental gear members 181 and may have integral laterally extending portions 211 (see Figs. 4 and 5) pivotally mounted on pins 213 supported by brackets 215 which brackets may be secured to the front intermediate walls 35. A stop lug 212 limits the clockwise turning movement of locking bar 209. A coil spring 217 biases the locking bar 209 in its downward position substantially as shown in Fig. 9 of the drawings, where the stop lug 212 engages the front intermediate wall 35, so that the locking bar 209 will be in its downward position, substantially as shown in Fig. 9 of the drawings.

It is to be noted that lug 177 on pinion 167 is so located thereon that turning movement thereof by its cooperating segmental gear will cause release of the last-previously operated segmental gear and arm portion 205 from the locking bar 209 to permit member 137 to move to its normal position where the timer speed will be a minimum. This ensures that an operator need press down on one of the buttons 153 to first cause release of the adjustment last previously used and a new adjustment of the manually operable timer control means as set forth hereinbefore.

It is, of course, necessary that an actuated segmental gear member 181 held in its actuated position by locking bar 209 be released therefrom when another push button and segmental gear member 181 is actuated at the will of an operator to obtain a different degree of toasting. As shown by the broken lines in Fig. 9 of the drawings, all of the other projections 205 are in a downward position and it is further evident that upward movement of another projection 205 caused by an operator pressing another button, will cause the arcuate surface of projection 205 to engage and raise locking bar 209 against the pull of spring 217 with the result that locking bar 209 is moved out of the recess 207 permitting the previously actuated segmental gear member to move back to its normal position under the influence of spring 161, that is, to the position shown in the broken lines in Fig. 9 of the drawings.

Reference to Fig. 4 of the drawings will show a stop lug 219 adapted to be engaged by the intermediate portion of the thermoflexible bar 193 when the same is heated and reference may here be made to my earlier Patent No. 2,077,627 issued April 20, 1937, wherein its theory of operation is set forth and the structures claimed.

Since it is desired that the heating elements be energized only during a toasting operation, I provide a pair of fixed contact members 221 insulatedly mounted on and supported by the bottom plate 25, a contact bridging member 223 being resiliently supported from the left-hand slider 67 so that when the sliders are moved downwardly and held by engagement of portion 121 under detent lever arm 117, the circuit through the toast heating elements will be closed and they will remain energized until the sliders are moved upwardly under the influence of spring 73 as has hereinbefore been described.

It is therefore evident that my invention provides a relatively simple means for obtaining substantially fixed degrees of toasting of slices of bread subjected to a toasting operation, it being only necessary for an operator to press a selected button which may have a legend thereon indicating the degree of toasting which will be obtained when the button is pushed downwardly through a fixed relatively small degree or distance.

While I have illustrated a specific embodiment of device embodying my invention I do not desire to be limited thereto and all obvious modifications coming clearly within the scope of the appended claims are to be considered as being covered thereby.

I claim as my invention:

1. Control means for a mechanical timer including a movable member connected with the timer for changing the speed of operation of the timer and means normally yieldingly biasing said speed-changing member to one of its extreme settings, said control means comprising a rotatable shaft mechanically connected with the speed-changing member to change the position thereof, a plurality of lever arms, means individually biasing the lever arms to an inoperative position, mechanical connecting means between the respective lever arms and the shaft, each connecting means including a lost motion, the lost motions being different for the different connecting means to ensure similar amounts of movement of the lever arms effecting different amounts of turning movement of the shaft and correspondingly different amounts of movement of the speed-changing member and a single member for engaging any one of the actuated lever arms to hold it in actuated position, said single holding member being engaged by a later actuated other lever arm to cause release therefrom of the previously actuated lever arm and its return to normal inoperative position.

2. Control means for a mechanical timer comprising a speed-changing member connected with the timer and effective on movement to change the speed of operation of the timer and spring means normally yieldingly biasing the speed-changing member to one of its extreme positions, said control means including a movable member connected with said speed-changing member to move the latter, a plurality of manually selectively-actuable elements each movable through a like distance, spring means normally yieldingly biasing said manually actuable elements to inoperative position, lost-motion connections between the individual manually-actuable elements and said movable member to cause different amounts of movement of the movable member and of the speed-changing member by similar amounts of movement of the respective manually-actuable elements and a single member for engaging any one of the actuated elements to hold it in actuated position, said single holding member being engageable by a later actuated element to cause release of the holding member from the previously actuated element and the return of the same to normal inoperative position.

3. Control means for a mechanical timer comprising a speed-changing member connected with the timer and effective on movement to change the speed of operation of the timer, a rack bar on said speed-changing member, a gear meshing with said rack bar, a shaft on which said gear is fixed, a plurality of spaced pins fixed in said shaft in longitudinal alinement thereon, a plurality of pinions loosely mounted on said shaft, a lateral lug on one face of each of the respective pinions adapted to engage a pin on the shaft, a plurality of pivotally mounted lever arms each having a gear segment thereon meshing with one of said loosely mounted pinions, the peripheral distance between the lateral lug and the cooperating shaft pin being different for the respective lever arms to provide different degrees of lost motion between the respective lever arms and the shaft, means normally yieldingly biasing the lever arms to normal positions and means for locking a lever arm in actuated position.

4. Control means for a mechanical timer comprising a speed-changing member connected with the timer and effective on movement to change the speed of operation of the timer, a rack bar on said speed-changing member, a gear meshing with said rack bar, a shaft on which said gear is fixed, a plurality of spaced pins fixed in said shaft in longitudinal alinement thereon, a plurality of pinions loosely mounted on said shaft, a lateral lug on one face of each of the respective pinions adapted to engage a pin on the shaft, a plurality of pivotally mounted lever arms each having a gear segment thereon meshing with one of said loosely mounted pinions, the peripheral distance between the lateral lug and the cooperating shaft pin being different for the respective lever arms to provide different degrees of lost motion between the respective lever arms and the shaft, means normally yieldingly biasing the lever arms to normal positions and a single member for locking any one of said lever arms in actuated position and means on said lever arms for engaging said locking member to cause it to release a prior actuated lever arm when another lever arm is actuated.

MURRAY IRELAND.